UNITED STATES PATENT OFFICE.

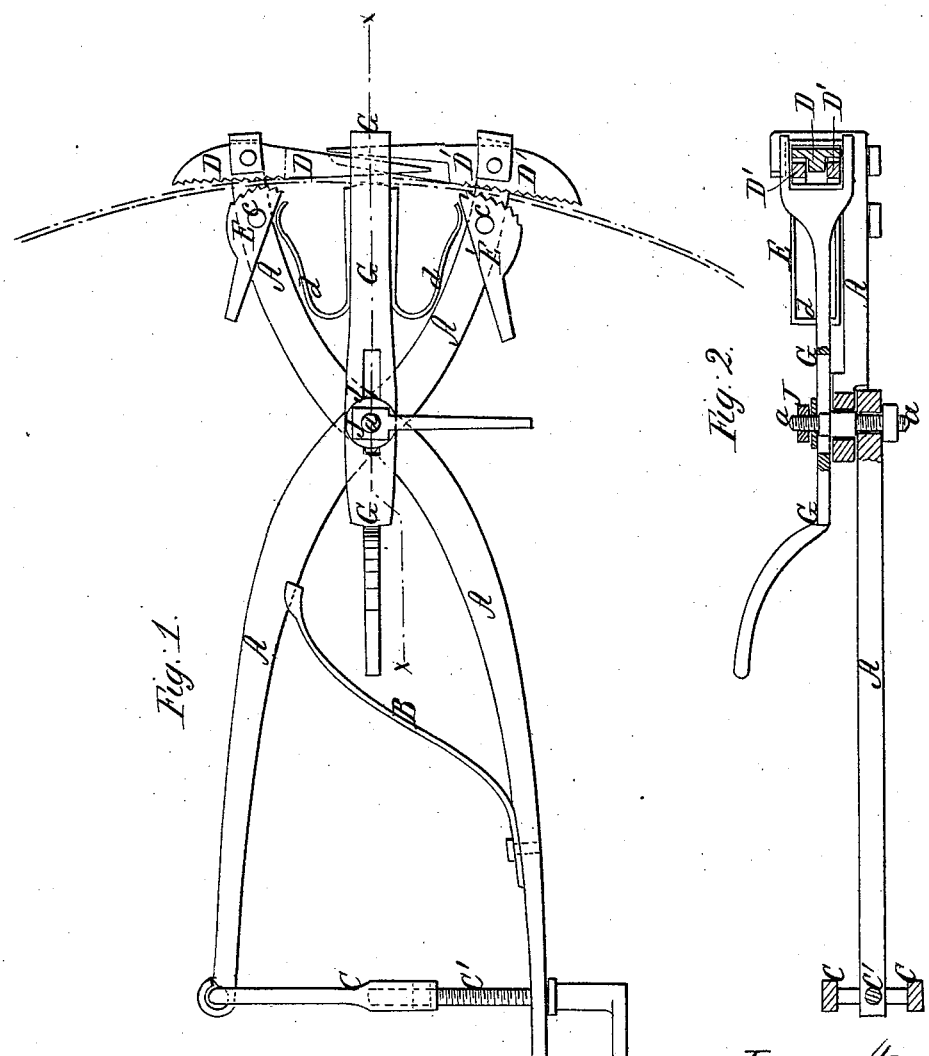

CASPER V. STATLER, OF WATAGA, ILLINOIS.

MACHINE FOR UPSETTING TIRES.

Specification of Letters Patent No. 29,529, dated August 7, 1860.

*To all whom it may concern:*

Be it known that I, CASPER V. STATLER, of Wataga, in the county of Knox and State of Illinois, have invented a new and useful Improved Machine for Upsetting Tires; and I do hereby declare that the following is a full, clear, and exact description thereof, reference being had to the accompanying drawings, making a part of this specification, in which—

Figure 1 shows a side view of my improved machine. Fig. 2 is a section taken through the plane indicated by the red lines $x, x$, in Fig. 1.

Similar letters of reference indicate corresponding parts in both figures.

This invention is an improvement in machines for shrinking or what is technically termed upsetting tires or metal bands of every description.

The invention consists in the employment of two levers jointed together like a pair of large pincers and operated so as to open and close by screw power applied to the longer arms of the levers; and it consists in combining with the jaws of these levers four jointed toothed dogs, and an adjustable bar, the dogs holding the tire firmly, and the adjustable bar confining the tire between the two pairs of dogs, in its proper place and preventing it from "kinking," while the dogs are brought closer together by contracting the longer arms of the levers with the screw power; all as will be hereinafter described and represented.

To enable those skilled in the art to fully understand my invention I will proceed to describe its construction and operation.

A, A, are two strong levers jointed together by a fulcrum pin $a$, so as to be capable of opening or closing, and furnished with a strong hooded spring B, for opening the jaws of the levers at a suitable time.

The two extreme long ends of the levers A, A, are connected together by a link C, and screw C′, with a crank handle applied to the screw whereby great power may be applied to close the jaws of the levers, or to bring the ends of the levers together. The opposite ends of the levers A, A, are bent up and over to receive on their sides the dogs D, D′, which are jointed to the ends of the levers. These dogs D, D′, are long and tapering and fit together when the machine is in operation by a groove and tenon which allows the abutting surface of the dogs to slip as the jaws are brought nearer together. The "biting" surfaces of the two dogs D, D′, are serrated as represented in Fig. 1, while the surfaces of the tapering parts are smooth.

E, E′, are two lever dogs pivoted at $c, c$, to the jaws of the levers A, A, and acted upon by springs $d, d$, projecting from each side of an adjustable bar G, so as to confine the tire in place against the dogs D, D′, preparatory to the operation of shrinking or upsetting it, the "biting" edges of these dogs E, E′, are also serrated so that the tire will be held firmly by them.

The bar G, has a forked end, as shown in Fig. 2, that grasps and holds the tire in place during the operation of shrinking it. This bar is slotted so as to allow it to play back and forth on the pin $a$; and J is a nut on the pin $a$, furnished with a handle so that the slotted bar G, may be rigidly set at any desirable point.

From this description it will be seen that the clamping dogs will adjust themselves to tires of almost any size or circle, and that by opening the jaws of the levers A, A, and introducing the tire edgewise between the two pairs of dogs, and then setting up the bar G, the dogs E, E′, will be brought to press against the tire, then upon screwing up the levers by screw C′, the dogs will clamp the tire tightly and compress the metal between the two jaws while the bar G, and wedge portions of the dogs D, D′, prevent the tire from bending or "kinking" under the operation.

Having thus described my invention what I claim as new, and desire to secure by Letters Patent, is—

The dogs D, D′, and E, E′, with adjustable bar G, and its springs $d, d$, in combination with the jointed levers A, A, operated by the screw and link C, C′, and arranged substantially in the manner and for the purposes herein set forth.

CASPER V. STATLER.

Witnesses:
  A. H. SQUIRE,
  JONAS WILLIAMS.